United States Patent [19]
Kubo et al.

[11] Patent Number: 5,470,902
[45] Date of Patent: Nov. 28, 1995

[54] RESIN COMPOSITION FOR AUTOMOBILE RELAY BOX AND AUTOMOBILE RELAY BOX COMPRISING THE SAME

[75] Inventors: Yoshinobu Kubo; Masamitsu Chishima, both of Yokkaichi, Japan

[73] Assignee: Sumitomo Wiring Systems, Ltd., Yokkaichi, Japan

[21] Appl. No.: 137,937

[22] Filed: Oct. 19, 1993

[30] Foreign Application Priority Data

Oct. 21, 1992 [JP] Japan ................................. 4-282883
Oct. 21, 1992 [JP] Japan ................................. 4-282884

[51] Int. Cl.$^6$ .................................................. C08K 5/09
[52] U.S. Cl. ...................... 524/400; 524/611; 524/394; 524/399; 525/390
[58] Field of Search ........................... 524/394, 400, 524/399, 611; 525/390, 397

[56] References Cited

U.S. PATENT DOCUMENTS

| | | | |
|---|---|---|---|
| 3,379,792 | 4/1968 | Finbolt . | |
| 4,315,086 | 2/1982 | Ueno et al. | 525/396 |
| 4,338,421 | 7/1982 | Maruyama et al. . | |
| 5,017,652 | 5/1991 | Abe et al. | 525/390 |
| 5,084,511 | 1/1992 | Abe et al. | 525/390 |
| 5,145,904 | 9/1992 | Muehlbach et al. | 524/611 |

FOREIGN PATENT DOCUMENTS

| | | |
|---|---|---|
| 0549268 | 6/1993 | European Pat. Off. . |
| 59-66452 | 4/1984 | Japan . |
| 59-41663 | 10/1984 | Japan . |
| 03-179054 | 8/1991 | Japan . |
| 04-183747 | 6/1992 | Japan . |
| 05-163429 | 6/1993 | Japan . |

OTHER PUBLICATIONS

A. V. Tobolsky, "Properties and Structures of Polymers" (John Willy & Sons, Inc., 1960), pp. 71–78.
WPI Abstract Accession No. 92–265678/32 (JP 04183747).

*Primary Examiner*—Veronica P. Hoke
*Attorney, Agent, or Firm*—Sandler, Greenblum & Bernstein

[57] ABSTRACT

A resin composition containing 100 parts by weight of a mixture containing 20 to 70% by weight of a polyphenylene ether which is modified with an unsaturated carboxylic acid compound having an ethylenic double bond and a carboxyl group or an acid anhydride group in a molecule and 30 to 80% by weight of a polyamide which contains 100 parts by weight of 6,6-nylon and 10 to 100 parts by weight of 6-nylon, 0.1 to 3 parts by weight of a metal salt of montanic acid, and optionally 5 to 70 parts by weight of polypropylene per 100 parts by weight of the modified polyphenylene ether in the mixture, which composition is suitable for the production of automobile relay boxes.

15 Claims, 1 Drawing Sheet

RESIN COMPOSITION FOR AUTOMOBILE RELAY BOX AND AUTOMOBILE RELAY BOX COMPRISING THE SAME

BACKGROUND OF THE INVENTION

1. Field of the Invention

The present invention relates to a resin composition which is suitable for the production of an automobile relay box and an automobile relay box comprising the same.

2. Description of the Related Art

Recently, automobiles are highly installed with electronics and include many electrical parts. The electrical parts are made of various plastic materials to reduce their weights and simplify their production steps. In particular, a material of a relay box is required to have good heat resistance, solvent resistance and mechanical strength. Further required are flowability and dimensional stability to mold a relay box having a complicated shape with good dimensional accuracy. As a material which satisfies these properties, 6,6-nylon is widely used. 6,6-Nylon is one of crystalline engineering plastics and is excellent in flowability, heat resistance and solvent resistance. However, due to its water absorption property, it suffers from decrease of mechanical properties and dimensional change. In addition, in a cold season, it is cracked by calcium chloride which is sprayed on a load as an antifreezing agent.

Needs for weight saving of the automobile are increasing, and it is desired to provide a material which is light and satisfies the properties necessary for the automobile relay box.

To remove the above defects of 6,6-nylon, it is proposed to compound polyphenylene ether in 6,6-nylon (cf. Japanese Patent Publication No. 41663/1984). However, when an automobile relay box is made of a resin composition comprising 6,6-nylon and polyphenylene ether, the decrease of mechanical properties or dimensional change caused by water absorption are prevented, but the moldability of 6,6-nylon is decreased, so that the flowability and mold releasability of the resin composition are insufficient for the production of a relay box having a complicated shape. In addition, weld strength of the molded relay box is decreased. In view of recyclability of the resin composition which is required for the automobiles in these years, the resin composition comprising 6,6-nylon and polyphenylene ether is unsatisfactory.

Accordingly, it has been highly desired to provide a resin material which is light and satisfies the properties required for the automobile relay box such as heat resistance, solvent resistance, mechanical resistance, weld strength, moldability, in particular, flowability and mold releasability, weathering resistance and recyclability.

SUMMARY OF THE INVENTION

One object of the present invention is to provide a resin composition which satisfies the above properties required for the automobile relay box.

Another object of the present invention is to provide an automobile relay box which satisfies the above requirements.

According to the present invention, there is provided a resin composition for an automobile relay box, comprising 100 parts by weight of a mixture containing (A) 20 to 70% by weight of a polyphenylene ether which is modified with an unsaturated carboxylic acid compound having a) an ethylenic double bond and b) a carboxyl group or an acid anhydride group in a molecule and (B) 30 to 80% by weight of a polyamide which comprises 100 parts by weight of 6,6-nylon and 10 to 100 parts by weight of 6-nylon, 0.1 to 3 parts by weight of (C) a metal salt of montanic acid, and optionally 5 to 70 parts by weight of (D) polypropylene per 100 parts by weight of said modified polyphenylene ether in said mixture.

The resin composition may further comprises 2 to 50 parts by weight of an elastomer per 100 parts by weight of said modified polyphenylene ether in said mixture.

DETAILED DESCRIPTION OF THE INVENTION

The polyphenylene ether to be used in the resin composition of the present invention is preferably a polyphenylene ether which is prepared by polycondensation of at least one monocyclic phenol of the formula:

wherein $R_1$ is a $C_1$–$C_3$ alkyl group, and $R_2$ and $R_3$ are independently a hydrogen atom or a $C_1$–$C_3$ alkyl group.

The polyphenylene ether includes a graft copolymer comprising the above polyphenylene ether to which an aromatic vinyl compound is graft polymerized. The polyphenylene ether may be a homopolymer or a copolymer.

Examples of the monocyclic phenol (I) are 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol, 2,6-dimethyl-3-propylphenol, and the like.

Preferred examples of the polyphenylene ether prepared by polycondensation of at least one of the above phenols are poly(2,6-dimethyl-1,4-phenylene)ether, poly(2,6-diethyl-1,4-phenylene )ether, poly(2,6-dipropyl-1,4-phenylene)ether, poly(2-methyl-6-ethyl-1,4 -phenylene)ether, poly(2-methyl-6-propyl-1,4-phenylene)ether, poly-(2-ethyl-6-propyl-1,4-phenylene)ether, 2,6-dimethylphenol/2,3,6 -trimethylphenol copolymer, 2;6-dimethylphenol/2,3,6-triethylphenol copolymer, 2,6-diethylphenol/2,3,6-trimethylphenol copolymer, 2,6-dipropylphenol/2,3,6-trimethylphenol copolymer, a graft copolymer comprising poly(2,6-dimethyl-1,4-phenylene)ether to which styrene is graft polymerized, a graft copolymer comprising a 2,3,6-trimethylphenol base copolymer to which styrene is graft polymerized, and the like. Among them, poly(2,6-dimethyl-1,4-phenylene)ether and 2,6-dimethylphenol/2,3,6-trimethylphenol copolymer are particularly preferred.

In general, the polyphenylene ether has an intrinsic viscosity of 0.1 to 0.7 dl/g, preferably 0.3 to 0.6 dl/g, when measured at 25° C. in chloroform. When the intrinsic viscosity of polyphenylene ether is less than 0.1 dl/g, the resin composition may become brittle. When the intrinsic viscosity exceeds 0.7 dl/g, the resin composition may have poor flowability.

The modifier to be used to modify the polyphenylene ether is an organic compound having both a) an ethylenic double bond and b) a carboxyl group or an acid anhydride group in a molecule. Such organic compounds include $\alpha,\beta$-unsaturated dicarboxylic and monocarboxylic acids as well as their anhydrides.

Specific examples of the $\alpha,\beta$-unsaturated dicarboxylic acids are maleic acid, chloromaleic acid, fumaric acid, citraconic acid, itaconic acid, and the like. Specific examples of the $\alpha,\beta$-unsaturated monocarboxylic acids are acrylic acid, butenoic acid (vinylacetic acid), crotonic acid, methacrylic acid, pentenoic acid, angelic acid, and the like. Among them, maleic acid, fumaric acid, acrylic acid, methacrylic acid and maleic anhydride are preferred. In particular, maleic anhydride is preferred. The $\alpha,\beta$-unsaturated dicarboxylic and monocarboxylic acids and their anhydrides may be used independently or as a mixture of two or more of them.

The modifier is usually used in an amount of 0.01 to 10 parts by weight, preferably 0.1 to 3 parts by weight, per 100 parts by weight of the polyphenylene ether. When the amount of the modifier is outside the above range, compatibility of the modified polyphenylene ether with nylon may be decreased, and as the result, the resin composition may become brittle.

The modified polyphenylene ether used in the present invention may be prepared by any of per se conventional methods. For example, the modified polyphenylene ether can be prepared by melt kneading a mixture of the polyphenylene ether and the modifier in the above ratio in a roll mill, a Banbury mixer or an extruder at a temperature of 150° to 350° C. for 0.1 to 10 minutes to react them. Alternatively, the polyphenylene ether and the modifier in the above ratio are heated and reacted in a solvent such as benzene, toluene or xylene at a temperature of 50° to 150° C. for 10 to 500 minutes. To accelerate the modification reaction, the reaction system may contain a radical polymerization initiator such as an organic peroxide (e.g. benzoyl peroxide, di-tert-butyl peroxide, dicumyl peroxide, tert-butyl peroxybenzoate, etc.) and an azo compound (e.g. azobisisobutyronitrile, azobisisovaleronitrile, etc.).

6,6-Nylon which is one ingredient of the polyamide component (B) used in the present invention is intended to mean a polyamide comprising repeating units of the formula: —CONH—, and may be prepared by a condensation reaction between hexamethylene diamine [H$_2$H—(CH$_2$)$_6$—NH$_2$] and adipic acid [HOOC—(CH$_2$)$_4$—COOH] or an adipate of the formula:

wherein R is an organic group such as a methyl group, an ethyl group, a propyl group or a phenyl group, or a condensation reaction between adipic acid and a diisocyanate of the formula:

In general, 6,6-nylon has a relative viscosity $\eta_{rel}$ of 2.2 to 3.2, preferably 2.4 to 3.0, when measured at 25° C. in 98% sulfuric acid at a concentration of 0.25 g/100 ml. When the relative viscosity is less than 2.2, a molded articled produced from the resin composition has decreased strength. When the relative viscosity exceeds 3.2, the resin composition has deteriorated moldability.

6-Nylon which is the other ingredient of the polyamide component (B) is prepared by ring opening reaction of ε-caprolactam.

In general, 6-nylon has a relative viscosity $\eta_{rel}$ of 2.2 to 3.2, preferably 2.3 to 3.0, when measured at 25° C. in 98% sulfuric acid at a concentration of 0.25 g/100 ml. When the relative viscosity is less than 2.2, a molded articled produced from the resin composition has decreased strength and heat resistance. When the relative viscosity exceeds 3.2, the resin composition has deteriorated moldability, and appearance at a weld part of the molded article is not improved.

In the polyamide component (B), 6-nylon is contained in an amount of 10 to 100 parts by weight, preferably 20 to 80 parts by weight per 100 parts by weight of 6,6-nylon. When the amount of 6-nylon is less than 10 parts by weight, the moldability of resin composition and the appearance at the weld part are not improved satisfactorily. When this amount is larger than 100 parts by weight, the molded article has deteriorated heat resistance.

A weight ratio of the modified polyphenylene ether (A) and the polyamide (B) is usually from 20:80 to 70:30, preferably from 30:70 to 60.

Specific examples of the metal salt of montanic acid are sodium montanate, potassium montanate, lithium montanate, calcium montanate, zinc montanate, barium montanate, aluminum montanate, etc. Among them, sodium montanate is preferred in view of its effects and availability in the industrial scale.

An amount of the metal salt of montanic acid (C) is from 0.1 to 3 parts by weight, preferably 0.2 to 1 parts by weight, per 100 parts by weight of the total amount of the modified polyphenylene ether (A) and the polyamide (B). When the amount of this salt is less than 0.1 parts by weight, the mold releasability of resin composition is not improved. When this amount exceeds 3 parts by weight, the mechanical properties of the molded article are deteriorated.

Polypropylene (D), which is optionally contained in the resin composition of the present invention, includes a homopolymer of propylene and copolymers of propylene such as ethylene-propylene copolymers, propylene-ethylene-α-olefin copolymer, etc. Preferably, polypropylene (D) has MFR (melt flow rate at 230° C. under load of 2.16 kg) of 1 to 100.

When polypropylene (D) is used, it is contained in the composition in an amount of 5 to 70 parts by weight, preferably 7 to 65 parts by weight per 100 parts by weight of the modified polyphenylene ether (A).

When the amount of polypropylene (D) is less than 5 parts by weight, the weight of the resin composition is not satisfactorily decreased. When it exceeds 70 parts by weight, the mechanical properties of the molded article may be decreased.

In one embodiment of the present invention, the resin composition may contain an elastomer. The elastomer is an elastomer of a general meaning, which is defined by A. V. Tobolsky, "Properties and Structures of Polymers" (John Willy & Sons, Inc., 1960), 71–78. According to this definition, the elastomer is a polymer having a Young's modulus of $10^5$ to $10^9$ dynes/cm$^2$ (0.1 to 1020 kg/cm$^2$) at room temperature.

Specific examples of the elastomer are styrene-butadiene random copolymer, styrene-butadiene block copolymer, styrene-isoprene block copolymer, styrene-butadiene triblock copolymer in which double bonds in the polybutadiene block are hydrogenated, styrene-isoprene triblock copolymer in which double bonds in the polyisoprene block are hydrogenated, nitrile rubber, ethylene-propylene copolymer, ethylene-propylene-diene copolymer (EPDM), Thiokol rubber, polysulfide rubber, polyacrylic acid rubber, polyurethane rubber, a graft copolymer of butyl rubber and polyethylene, polyester elastomer, polyamide elastomer. Among them, the A-B-A' type triblock copolymer is preferred. In this type of triblock copolymer, preferably the terminal blocks A and A' are polymerized vinyl aromatic hydrocarbon blocks, while the block B is a polymerized conjugate diene block or a polymerized conjugated diene block in which most of double bonds are hydrogenated, and a molecular weight of the block B is larger than the total molecular weight of the blocks A and A'. The blocks A and A' may be the same or different and comprise thermoplastic homo- or copolymer derived from a vinyl aromatic compound in which an aromatic moiety may be monocyclic or polycyclic.

Specific examples of such vinyl aromatic compound are styrene, α-methylstyrene, vinyltoluene, vinylxylene, ethylvinylxylene, vinylnaphthalene, and mixtures thereof.

Preferably, the center block B comprises an elastomeric polymer which is derived from a conjugated diene hydrocarbon such as 1,3-butadiene, 2,3-dimethylbutadiene, isoprene, 1,3-pentadiene or a mixture thereof, and most of double bonds of which may be hydrogenated.

Preferably, the molecular weight of each of the terminal blocks A and A' is from about 5000 to about 50,000, while the molecular weight of the center block B is from about 25,000 to about 1,500,000.

The elastomer is contained in the resin composition in an amount of 2 to 50 parts by weight, preferably 5 to 40 parts by weight per 100 parts by weight of the modified polyphenylene ether.

The resin composition of the present invention may contain other resin; conventionally used additives such as a flame retardant, a flame retardant aid, a stabilizer, a UV light absorber, a plasticizer, a lubricant, etc.; a pigment; a filler; and the like.

Examples of other resin are polystyrene base resin, epoxy resin, polycarbonate resin, polyester resin, polyphenylene sulfide, and the like.

To prepare the resin composition of the present invention, in general, the essential and optional ingredients are mixed and melt kneaded. The kneading temperature is usually from 230° to 370° C., preferably from 250° to 320° C. The mixture can be kneaded with any of conventionally used equipments such as an extruder, a kneader, a Banbury mixer, rolls, etc.

In general the automobile relay box is produced by injection molding. For example, the resin composition of the present invention is pelletized, and the pellets are injection molded using an injection molding machine at a cylinder temperature of 250° to 320° C., at a mold temperature of 40° to 120° C. under a molding pressure of 500 to 2000 kg/cm².

Figure 1:
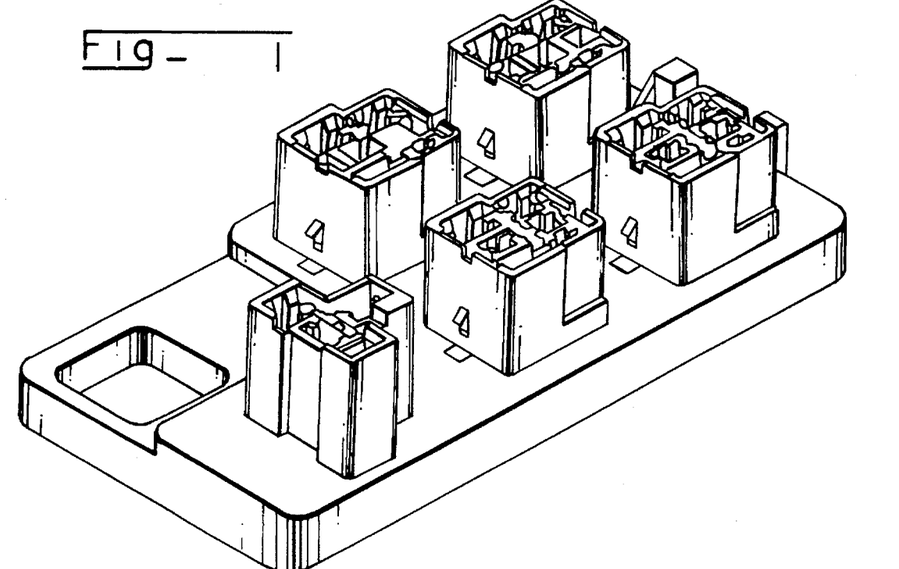
FIG. 1 shows a perspective view of an embodiment of the automobile relay box according to the present invention.

FIG. 1 shows a perspective view of an embodiment of the automobile relay box.

EXAMPLES

The preparation of modified polyphenyleneether will be explained in Preparative Examples, and the preparation of a resin composition and a relay box therefrom according to the present invention in Examples. The invention is not limited by the examples in any way.

Preparative Example 1

To 3 kg of a polymer of 2,6-dimethylphenol (i.e., polyphenylene ether) having an intrinsic viscosity of 0.45 dl/g in chloroform at 25° C., 450 g of Krayton G 1651 (an elastomeric hydrogenated styrene-butadiene-styrene copolymer, available from Shell Chemicals) and 24 g of maleic anhydride were added and they were mixed by means of a Henschel mixer. Thereafter, the resulting mixture was melted and kneaded at a temperature of from 300° C. to 320° C. for about 2 minutes with a twin-screw extruder, and extruded to obtain pellets of a mixture containing maleic anhydride modified polyphenylene ether.

Preparative Example 2

To 1.86 kg of the polymer of 2,6-dimethylphenol used in Preparative Example 1,450 g of Krayton G 1651, 1.14 kg of polypropylene (K-1014, available from Chisso Corporation) and 24 g of maleic anhydride were added and they were mixed by the Henschel mixer. Thereafter, the resulting mixture was melted and kneaded at a temperature of from 280° C. to 320° C. for about 2 minutes with the twin-screw extruder, and extruded to obtain pellets of a mixture containing polypropylene and maleic anhydride modified polyphenylene ether in a weight ratio of 60:100.

Comparative Preparative Example 1

To 1.50 kg of the polymer of 2,6-dimethylphenol used in Preparative Example 1,450 g of Krayton G 1651, 1.50 kg of polypropylene (K-1104) and 24 g of maleic anhydride were added and they were mixed by means of the Henschel mixer. Thereafter, the resulting mixture was melted and kneaded at a temperature of from 280° C. to 320° C. for about 2 minutes with the twin-screw extruder, and extruded to obtain pellets of a mixture containing polypropylene and maleic anhydride modified polyphenylene ether in a weight ratio of 98:100.

Examples 1–6 and Comparative Examples 1–5

There were mixed 40 parts by weight of the pellets obtained in Preparative Example 1 which contained maleic anhydride modified polyphenylene ether, 40 parts by weight of 6,6-nylon (Amilan CM-3007-N, available from Toray Industries, Inc., a relative viscosity in 98% sulfuric acid at a concentration of 0.25 g/dl and at 25° C. ($\eta_{rel}$): 2.70), 20 parts by weight of 6-nylon (Amilan CM-1017, available from Toray Industries Inc., a relative viscosity in 98% sulfuric acid at a concentration of 0.25 g/dl and 25° C. ($\eta_{rel}$):2.65 and an additive indicated in Table 1. Then the mixture was melted and kneaded at a temperature of from 240° C. to 300° C. by means of a twin-screw extruder, and extruded to obtain pellets of a molding composition. The molding composition was injection molded under the conditions described below to provide a test specimen and an automobile relay box.

Example 7

There were mixed 40 parts by weight of the pellets obtained in Preparative Example 1 which contained maleic anhydride modified polyphenylene ether, 45 parts by weight of 6,6-nylon (Amilan CM-3007-N), 15 parts by weight of 6-nylon (Amilan CM-017) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Example 8

There were mixed 40 parts by weight of the pellets obtained in Preparative Example 1 which contain maleic anhydride modified polyphenylene ether, 35 parts by weight of 6,6-nylon (Amilan CM-3007-N), 25 parts by weight of 6-nylon (Amilan CM-1017) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Comparative Example 6

There were mixed 40 parts by weight of the pellets obtained in Preparative Example 1 which contained maleic anhydride modified polyphenylene ether, 20 parts by weight of 6,6-nylon (Amilan CM-3007-N), 40 parts by weight of 6-nylon (Amilan CM-1017) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Comparative Example 7

There were mixed 40 parts by weight of the pellets obtained in Preparative Example 1 which contained maleic anhydride modified polyphenylene ether, 57 parts by weight of 6,6-nylon (Amilan CM-3007-N), 3 parts by weight of 6-nylon (Amilan CM-1017) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Comparative Example 8

There were mixed 40 parts by weight of the pellets obtained in Preparative Example 1 which contained maleic anhydride modified polyphenylene ether, 40 parts by weight of 6,6-nylon (Amilan CM-3007-N), 20 parts by weight of 6-nylon (UBE nylon 1011 FB, available from Ube Industries, Ltd., a relative viscosity in 98% sulfuric acid at a concentration of 0.25 g/dl at 25° C. ($\eta_{rel}$): 2.10) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Examples 9–14 and Comparative Examples 9–13

There were mixed 60 parts by weight of the pellets obtained in Preparative Example 2 which contained polypropylene and maleic anhydride modified polyphenylene ether, 28 parts by weight of 6,6-nylon (Amilan CM-3007-N), 12 parts by weight of 6-nylon (Amilan CM-1017) and an additive shown in Table 2. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Example 15

There were mixed 60 parts by weight of the pellets obtained in Preparative Example 2 which contained polypropylene and maleic anhydride modified polyphenylene ether, 32 parts by weight of 6,6-nylon (Amilan CM-3007-N), 8 parts by weight of 6-nylon (Amilan CM-1017) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Example 16

There were mixed 60 parts by weight of the pellets obtained in Preparative Example 2 which contained polypropylene and maleic anhydride modified polyphenylene ether, 24 parts by weight of 6,6-nylon (Amilan CM-3007-N), 16 parts by weight of 6-nylon (Amilan CM-1017) and 0.5 part by weight of sodium montanate. Then the mixture was melted and kneaded at a temperature of from 240° C. to 300° C. by means of the a twin-screw extruder, and extruded to obtain pellets of a molding composition. The molding composition was injection molded under the conditiosn described below to provide a test specimen and an automobile relay box.

Comparative Example 14

There were mixed 60 parts by weight of the pellets obtained in Preparative Example 2 which contained polypropylene and maleic anhydride modified polyphenylene ether, 10 parts by weight of 6,6-nylon (Amilan CM-3007-N), 30 parts by weight of 6-nylon (Amilan CM-1017) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Comparative Example 15

There were mixed 60 parts by weight of the pellets obtained in Preparative Example 2 which contained polypropylene and maleic anhydride modified polyphenylene ether, 38 parts by weight of 6,6-nylon (Amilan CM-3007-N, available from Toray Corporation), 2 parts by weight of 6-nylon (Amilan CM-1017) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen. However, an automobile relay box failed to be molded due to poor fluidity of the molding composition.

Comparative Example 16

There were mixed 60 parts by weight of the pellets obtained in Preparative Example 2 which contained polypropylene and maleic anhydride modified polyphenylene ether, 28 parts by weight of 6,6-nylon (Amilan CM-3007-N), 12 parts by weight of 6-nylon (UBE nylon 1011FB, available from Ube Industries, Ltd.) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and an automobile relay box.

Comparative Example 17

There were mixed 60 parts by weight of the pellets obtained in Comparative Preparative Example 2 which contained polypropylene and maleic anhydride modified polyphenylene ether, 28 parts by weight of 6,6-nylon (Amilan CM-3007-N), 12 parts by weight of 6-nylon (Amilan CM-1017) and 0.5 part by weight of sodium montanate. Then the mixture was melted and kneaded at a temperature of from 240° C. to 300° C. by means of the twin-screw extruder, and extruded to obtain pellets of a molding composition. The molding composition was injection molded under the conditions described below to provide a test specimen and automobie relay box.

Performance Evaluation

Mold releasability, tensile yield strength, tensile elongation at break, lance strength, heat aging characteristic, reusability and weathering properties were evaluated on the molded article.

(1) Mold releasability

A box-typed molded article was injection molded at a cylinder temperature of 280° C. under a molding pressure of 800 kgf/cm$^a$ and at a mold temperature of 80° C. from the molding composition described above. A resistance to releasing the molded article from a mold was determined to evaluate the mold releasability of the molding composition used. The results are given in Tables 1 and 2.

TABLE 1

| Molding Composition | Additive[c] (part by weight) | T.Y.S[a] (kgf/cm$^2$) | T.E.A.B[b] (%) | Resistance to Release (kg) |
|---|---|---|---|---|
| Example 1 | Na Mon (0.1) | 630 | 110 | 80 |
| Example 2 | Na Mon (0.2) | 625 | 105 | 63 |
| Example 3 | Na Mon (0.5) | 620 | 100 | 52 |
| Example 4 | Na Mon (3.0) | 590 | 90 | 45 |
| Example 5 | Ca Mon (0.2) | 630 | 104 | 65 |

TABLE 1-continued

| Molding Composition | Additive[c] (part by weight) | T.Y.S[a] (kgf/cm$^2$) | T.E.A.B[b] (%) | Resistance to Release (kg) |
|---|---|---|---|---|
| Example 6 | Zn Mon (0.2) | 620 | 107 | 70 |
| Comp. Ex. 1 | (—) | 640 | 110 | 100 |
| Comp. Ex. 2 | Na Mon (5.0) | 500 | 50 | 43 |
| Comp. Ex. 3 | Ca Ste (0.5) | 625 | 105 | 55 |
| Comp. Ex. 4 | Na Phos (0.5) | 610 | 100 | 60 |
| Comp. Ex. 5 | Hoechst wax E (0.2) | 600 | 110 | 86 |

[a]Tensile yield strength
[b]Tensile elongation at break
[c]Na Mon: sodium montanate, Ca Mon: calcium montanate
Zn Mon: zinc montanate, Ca Ste: calcium stearate
Na Phos: sodium phosphonate

TABLE 2

| Molding Composition | Additive[c] (part by weight) | T.Y.S[a] (kgf/cm$^2$) | T.E.A.B[b] (%) | Resistance to Release (kg) |
|---|---|---|---|---|
| Example 9 | Na Mon (0.1) | 520 | 115 | 77 |
| Example 10 | Na Mon (0.2) | 510 | 115 | 62 |
| Example 11 | Na Mon (0.5) | 500 | 110 | 50 |
| Example 12 | Na Mon (3.0) | 480 | 90 | 45 |
| Example 13 | Ca Mon (0.2) | 510 | 110 | 63 |
| Example 14 | Zn Mon (0.2) | 505 | 105 | 69 |
| Comp. Ex. 9 | (—) | 630 | 110 | 98 |
| Comp. Ex. 10 | Na Mon (5.0) | 420 | 50 | 42 |
| Comp. Ex. 11 | Ca Ste (0.5) | 505 | 110 | 53 |
| Comp. Ex. 12 | Na Phos (0.5) | 490 | 105 | 58 |
| Comp. Ex. 13 | Hechstwax E (0.2) | 480 | 120 | 85 |

[a]Tensile yield strength
[b]Tensile elongation at break
[c]Na Mon: sodium montanate, Ca Mon: calcium montanate
Zn Mon: zinc montanate, Ca Ste: calcium stearate
Na Phos: sodium phosphonate (2) Tensile yield strength and Tensile elongation at break A dumbbell specimen of ⅛ inch thickness was injection molded at a cylinder temperature of 280° C. under a molding pressure of 1000 kgf/cm$^2$ and at a mold temperature of 80° C. from the molding composition described above. Tensile yield strength and tensile elongation at break were measured on the specimen in accordance with ASTM D-638. The results are given in Tables 1 through 4.

TABLE 3

| Molding Composition | Dumbbell | | Weld Dumbbell | | Depth of Weld (μm) |
|---|---|---|---|---|---|
| | T.Y.S[a] (kgf/cm$^2$) | T.E.A.B[b] (%) | T.Y.S (kgf/cm$^2$) | T.E.A.B (%) | |
| Example. 3 | 620 | 110 | 620 | 110 | 1.90 |
| Comp. Ex. 6 | 580 | 150 | 580 | 150 | 1.60 |
| Comp. Ex. 7 | 640 | 100 | 630 | 50 | 7.50 |
| Comp. Ex. 8 | 600 | 80 | 600 | 80 | 1.90 |
| Example 7 | 630 | 110 | 630 | 90 | 4.90 |
| Example 8 | 610 | 120 | 610 | 120 | 1.80 |

[a] Tensile yield strength
[b] Tensile elongation at brek

TABLE 4

| Molding Composition | Dumbbell | | Weld Dumbbell | | Depth of Weld (μm) |
|---|---|---|---|---|---|
| | T.Y.S[a] (kgf/cm$^2$) | T.E.A.B[b] (%) | T.Y.S (kgf/cm$^2$) | T.E.A.B (%) | |
| Example 11 | 500 | 110 | 500 | 110 | 2.0 |
| Example 15 | 510 | 100 | 510 | 100 | 4.9 |
| Example 16 | 490 | 120 | 490 | 120 | 1.9 |
| Comp. Ex. 14 | 470 | 130 | 470 | 130 | 1.7 |
| Comp. Ex. 15 | 510 | 100 | 500 | 50 | 7.6 |
| Comp. Ex. 16 | 490 | 80 | 490 | 80 | 2.0 |
| Comp. Ex. 17 | 450 | 60 | 430 | 40 | 2.8 |

[a] Tensile yield strength
[b] Tensile elongation at break (3) Lance Strength

Figure 2:
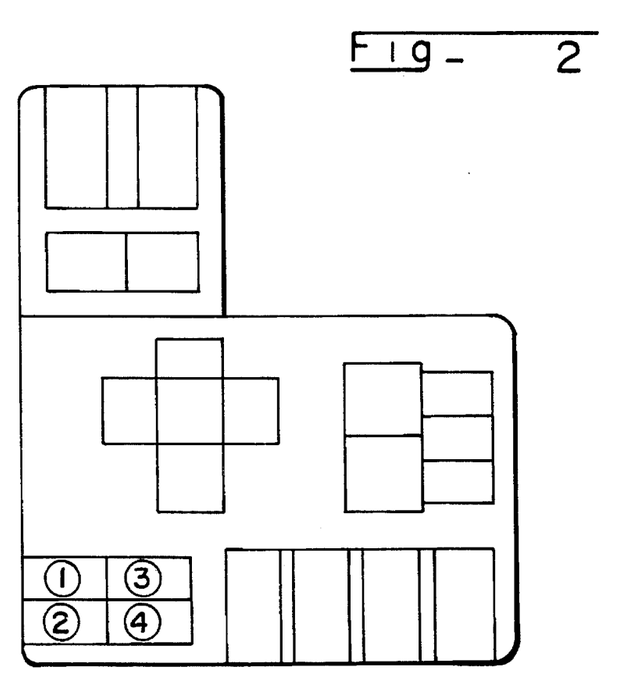
FIG. 2 is a plan view of an automobile relay box which is used in the performance evaluation tests.

A relay box as shown in FIG. 2 was injection molded at a cylinder temperature of 290° C. under a molding pressure of 1000 kgf/cm$^2$ and at a mold temperature of 50° C. from the molding composition described above. In order to determine the lance strength of the relay box, a metal terminal was inserted into a lance which was located inside terminal inserting openings 1–4 in the relay box, and then tensile testing was carried out.

Furthermore, the relay box was subjected to heat-treatment at a temperature of 120° C. and 150° C. for 1,000 hours, respectively, and then the lance strength was determined as described above. The results are given in Tables 5 and 6.

TABLE 5

| Molding Composition | Lance No. | Lance Strength (kgf) | | |
|---|---|---|---|---|
| | | Original | 120° C. × 1000 hr. | 150° C. × 1000 hr. |
| Example 3 | 1 | 9.7 | 15.3 | 12.4 |
| | 2 | 10.2 | 15.5 | 15.0 |
| | 3 | 9.7 | 15.6 | 11.4 |
| | 4 | 10.1 | 15.2 | 12.7 |
| Example 7 | 1 | 10.0 | 15.5 | 13.1 |
| | 2 | 10.4 | 15.8 | 14.5 |
| | 3 | 10.1 | 15.7 | 13.4 |
| | 4 | 10.3 | 15.4 | 14.1 |
| Example 8 | 1 | 9.6 | 15.0 | 12.2 |
| | 2 | 10.0 | 15.3 | 13.4 |
| | 3 | 9.5 | 15.1 | 11.6 |
| | 4 | 9.9 | 15.2 | 12.1 |
| Comp. Ex. 6 | 1 | 9.1 | 14.1 | 8.5 |
| | 2 | 9.6 | 14.2 | 8.7 |
| | 3 | 9.2 | 14.0 | 8.6 |
| | 4 | 9.3 | 13.9 | 8.6 |
| Comp. Ex. 8 | 1 | 9.3 | 14.2 | 8.6 |
| | 2 | 9.7 | 14.5 | 8.8 |

TABLE 5-continued

| Molding Composition | Lance No. | Lance Strength (kgf) | | |
|---|---|---|---|---|
| | | Original | 120° C. × 1000 hr. | 150° C. × 1000 hr. |
| | 3 | 9.4 | 14.3 | 8.8 |
| | 4 | 9.5 | 14.3 | 8.7 |

TABLE 6

| Molding Composition | Lance No. | Lance Strength (kgf) | | |
|---|---|---|---|---|
| | | Original | 120° C. × 1000 hr. | 150° C. × 1000 hr. |
| Example 11 | 1 | 9.2 | 13.2 | 11.8 |
| | 2 | 9.6 | 13.5 | 12.8 |
| | 3 | 9.2 | 13.4 | 11.5 |
| | 4 | 9.6 | 13.2 | 12.2 |
| Example 15 | 1 | 9.4 | 13.5 | 11.7 |
| | 2 | 9.9 | 13.7 | 12.1 |
| | 3 | 9.6 | 13.5 | 12.3. |
| | 4 | 9.8 | 13.4 | 12.5 |
| Example 16 | 1 | 9.2 | 13.0 | 11.1 |
| | 2 | 9.5 | 13.3 | 12.3 |
| | 3 | 9.1 | 12.8 | 11.0 |
| | 4 | 9.4 | 13.1 | 11.4 |
| Comp. Ex. 14 | 1 | 8.6 | 12.1 | 7.5 |
| | 2 | 9.1 | 12.2 | 7.7 |
| | 3 | 8.8 | 12.0 | 7.6 |
| | 4 | 8.7 | 12.6 | 7.5 |
| Comp. Ex. 16 | 1 | 8.8 | 12.2 | 7.6 |
| | 2 | 9.2 | 12.5 | 8.1 |
| | 3 | 8.9 | 12.3 | 7.8 |
| | 4 | 9.2 | 12.6 | 7.9 |
| Comp. Ex. 17 | 1 | 8.4 | 11.8 | 7.2 |
| | 2 | 8.5 | 11.9 | 7.5 |
| | 3 | 8.2 | 11.5 | 7.1 |
| | 4 | 8.3 | 11.6 | 7.7 |

(4) Heat Aging Characteristics

The dumbbell specimen prepared in above test (2) was kept in a hot-air cabinet at a temerature of 120flC and 160flC, respectively, for given aging period. Thereafter, the tensile yield strength and the tensile elongation at break of the specimens were determined in accordance with ASTM D-638. The results are given in Tables 7 and 8.

TABLE 7

| Molding Composition | Aging Temp (°C.) | | Aging Period (hrs) | | | | |
|---|---|---|---|---|---|---|---|
| | | | 0 | 50 | 100 | 200 | 500 |
| Example 3 | 120 | T.Y.S (kgf/cm$^2$)[a] | 620 | 620 | 640 | 630 | 630 |
| | | T.E.A.B (%)[b] | 110 | 110 | 110 | 90 | 90 |
| | 160 | T.Y.S (kgf/cm$^2$) | 620 | 620 | 640 | 630 | 500 |
| | | T.E.A.B (%) | 110 | 90 | 60 | 20 | 5 |
| Example 7 | 120 | T.Y.S (kgf/cm$^2$) | 630 | 630 | 640 | 630 | 630 |
| | | T.E.A.B (%) | 110 | 110 | 110 | 90 | 90 |
| | 160 | T.Y.S (kgf/cm$^2$) | 630 | 630 | 640 | 630 | 500 |
| | | T.E.A.B (%) | 110 | 90 | 60 | 20 | 5 |
| Example 8 | 120 | T.Y.S (kgf/cm$^2$) | 610 | 610 | 630 | 620 | 620 |
| | | T.E.A.B (%) | 120 | 120 | 120 | 100 | 90 |
| | 160 | T.Y.S (kgf/cm$^2$) | 610 | 610 | 630 | 600 | 470 |
| | | T.E.A.B (%) | 120 | 80 | 40 | 10 | 5 |
| Comp. Ex. 6 | 120 | T.Y.S (kgf/cm$^2$) | 580 | 580 | 590 | 590 | 600 |
| | | T.E.A.B (%) | 150 | 150 | 150 | 120 | 60 |
| | 160 | T.Y.S (kgf/cm$^2$) | 580 | 580 | 600 | 530 | 420 |
| | | T.E.A.B (%) | 150 | 60 | 10 | 5 | 3 |
| Comp. Ex. 7 | 120 | T.Y.S (kgf/cm$^2$) | 640 | 640 | 660 | 660 | 670 |
| | | T.E.A.B (%) | 100 | 100 | 100 | 90 | 80 |
| | 160 | T.Y.S (kgf/cm$^2$) | 640 | 630 | 660 | 650 | 580 |
| | | T.E.A.B (%) | 100 | 80 | 40 | 10 | 5 |
| Comp. Ex 8 | 120 | T.Y.S (kgf/cm$^2$) | 600 | 610 | 610 | 600 | 600 |
| | | T.E.A.B (%) | 80 | 80 | 80 | 60 | 40 |
| | 160 | T.Y.S (kgf/cm$^2$) | 600 | 610 | 610 | 540 | 430 |
| | | T.E.A.B (%) | 80 | 60 | 20 | 5 | 3 |

[a] Tensile yield strength
[b] Tensile elongation at break

TABLE 8

| Molding Composition | Aging Temp (°C.) | | Aging Period (hrs) | | | | |
|---|---|---|---|---|---|---|---|
| | | | 0 | 50 | 100 | 200 | 500 |
| Example 11 | 120 | T.Y.S (kgf/cm$^2$)[a] | 500 | 510 | 520 | 520 | 520 |
| | | T.E.A.B (%)[b] | 110 | 110 | 110 | 100 | 90 |
| | 160 | T.Y.S (kgf/cm$^2$) | 500 | 510 | 520 | 510 | 410 |
| | | T.E.A.B (%) | 110 | 90 | 60 | 20 | 5 |
| Example 15 | 120 | T.Y.S (kgf/cm$^2$) | 510 | 510 | 520 | 510 | 510 |
| | | T.E.A.B (%) | 110 | 110 | 110 | 100 | 90 |
| | 160 | T.Y.S (kgf/cm$^2$) | 510 | 520 | 520 | 520 | 410 |
| | | T.E.A.B (%) | 110 | 90 | 60 | 20 | 5 |
| Example 16 | 120 | T.Y.S (kgf/cm$^2$) | 490 | 490 | 510 | 500 | 500 |
| | | T.E.A.B (%) | 120 | 120 | 120 | 100 | 90 |
| | 160 | T.Y.S (kgf/cm$^2$) | 490 | 500 | 510 | 490 | 400 |
| | | T.E.A.B (%) | 120 | 80 | 40 | 10 | 5 |
| Comp. Ex. 14 | 120 | T.Y.S (kgf/cm$^2$) | 470 | 470 | 480 | 480 | 470 |
| | | T.E.A.B (%) | 130 | 130 | 120 | 110 | 60 |
| | 160 | T.Y.S (kgf/cm$^2$) | 470 | 480 | 490 | 430 | 350 |
| | | T.E.A.B (%) | 130 | 60 | 10 | 5 | 3 |
| Comp. Ex. 15 | 120 | T.Y.S (kgf/cm$^2$) | 510 | 510 | 530 | 530 | 520 |
| | | T.E.A.B (%) | 100 | 100 | 100 | 90 | 80 |
| | 160 | T.Y.S (kgf/cm$^2$) | 510 | 520 | 530 | 520 | 440 |
| | | T.E.A.B (%) | 100 | 80 | 40 | 10 | 5 |
| Comp. Ex. 16 | 120 | T.Y.S (kgf/cm$^2$) | 490 | 500 | 500 | 490 | 490 |
| | | T.E.A.B (%) | 80 | 80 | 80 | 60 | 40 |
| | 160 | T.Y.S (kgf/cm$^2$) | 490 | 500 | 500 | 440 | 360 |
| | | T.E.A.B (%) | 80 | 60 | 20 | 5 | 3 |
| Comp. Ex. 17 | 120 | T.Y.S (kgf/cm$^2$) | 450 | 450 | 460 | 450 | 450 |
| | | T.E.A.B (%) | 60 | 60 | 60 | 50 | 40 |
| | 160 | T.Y.S (kgf/cm$^2$) | 450 | 460 | 460 | 400 | 300 |
| | | T.E.A.B (%) | 60 | 40 | 10 | 5 | 3 |

[a] Tensile yield strength
[b] Tensile elongation at break

(5) Reusability

A dumbbell specimen of ⅛ inch thickness was injection molded at a cylinder temperature of 280° C. under a molding pressure of 1,000 kgf/cm$^2$ and at a mold temperature of 80° C. from the molding composition described above, and then ground to fine mesh. Using the regrind, a dumbbell specimens was again prepared under the same conditions as those described above. Such reprocessed procedure was repeated ten times. Tensile yield strength and tensile elongation at break were determined on the each reprocessed dumbbell in accordance with ASTM D-638 to evaluate the reusability of the materials used in the pesent invention. The results are given in Table 9 and 10.

TABLE 9

| Number Reprocessing | Example 3 | | Comp. Examp. 3 | | Comp Examp. 4 | |
|---|---|---|---|---|---|---|
| | T.Y.S[a] (kgf/cm$^2$) | T.E.A.B[b] (%) | T.Y.S (kgf/cm$^2$) | T.E.A.B (%) | T.Y.S (kgf/cm$^2$) | T.E.A.B (%) |
| 0 | 620 | 105 | 625 | 105 | 610 | 100 |
| 1 | 620 | 103 | 620 | 103 | 600 | 98 |
| 2 | 620 | 102 | 615 | 100 | 600 | 98 |
| 3 | 615 | 102 | 610 | 98 | 590 | 95 |
| 4 | 615 | 100 | 590 | 95 | 580 | .93 |
| 5 | 600 | 98 | 570 | 92 | 570 | 90 |
| 6 | 600 | 96 | 550 | 87 | 550 | 85 |
| 7 | 595 | 95 | 530 | 80 | 505 | 70 |
| 8 | 580 | 93 | 500 | 70 | 480 | 55 |
| 9 | 585 | 92 | 450 | 65 | 450 | 53 |
| 10 | 585 | 90 | 420 | 55 | 400 | 50 |

[a] Tensile yield strength
[b] Tensile elongation at break

TABLE 10

| Number Reprocessing | Example 11 | | Comp. Examp. 11 | | Comp Examp. 12 | |
|---|---|---|---|---|---|---|
| | T.Y.S[a] (kgf/cm$^2$) | T.E.A.B[b] (%) | T.Y.S (kgf/cm$^2$) | T.E.A.B (%) | T.Y.S (kgf/cm$^2$) | T.E.A.B (%) |
| 0 | 500 | 110 | 505 | 110 | 490 | 105 |
| 1 | 500 | 110 | 500 | 108 | 480 | 101 |
| 2 | 500 | 108 | 495 | 102 | 475 | 99 |
| 3 | 495 | 112 | 490 | 97 | 470 | 96 |
| 4 | 495 | 106 | 475 | 94 | 460 | 93 |
| 5 | 485 | 102 | 460 | 90 | 450 | 88 |
| 6 | 480 | 100 | 450 | 85 | 435 | 84 |
| 7 | 470 | 97 | 435 | 82 | 410 | 74 |
| 8 | 470 | 94 | 410 | 74 | 395 | 58 |
| 9 | 465 | 91 | 370 | 63 | 360 | 52 |
| 10 | 460 | 90 | 330 | 52 | 310 | 47 |

[a] Tensile yield strength
[b] Tensile elongation at break (6) Weathering Properties The dumbbell specimen prepared in above test (2) from the molding compositin of Example 11 was tested for weathering resistance for 1,000 hours using a weatherometer. A black panel temperature of the weatherometer was 60flC and a rainfall cycle was 18 minutes/120 minutes. The weathering properties was evaluated by measuring the color change (ΔE), the tensile strength and the tensile elongation at break of the specimens after the weathering test as well as by observing an appearance of it by means of a light microscope. The results are given in Table 11.

TABLE 11

| | Example 11 | | | |
|---|---|---|---|---|
| Time (hr) | T.Y.S[a] (kgf/cm$^2$) | T.E.A.B[b] (%) | ΔE | Appearance |
| 0 | 500 | 110 | 0 | — |
| 100 | 490 | 115 | 0.9 | no change |
| 300 | 475 | 115 | 2.8 | no change |
| 500 | 470 | 115 | 3.5 | no change |
| 1000 | 465 | 115 | 4.7 | no change |

[a] Tensile yield strength
[b] Tensile elongation at break

As described in details above, the molding composition used in accordance with the present invention is exellent in molding properties (particularly in fluidity and releasability). The car relay box obtained therefrom meets requirements for heat resistance, mechanical strength, weld strength, weathering properties, solvent resistance and reusability. Furthermore, the car relay box is low in weight since it is produced from a light molding composition. and the process for preparing it can be simplified since the treatment for moisture-proofing is not required.

What is claimed is:

1. A resin composition for an automobile relay box, comprising
   100 parts by weight of a mixture containing
   (A) 20 to 70% by weight of a polyphenylene ether which is modified with an unsaturated carboxylic acid compound having a) an ethylenic double bond and b) a carboxyl group or an acid anhydride group in a molecule and
   (B) 30 to 80% by weight of a polyamide which comprises 100 parts by weight of 6,6-nylon and 10 to 100 parts by weight of 6-nylon, and
   0.1 to 3 parts by weight of (C) a metal salt of montanic acid.

2. The resin composition according to claim 1, which further comprises 5 to 70 parts by weight of (D) polypropylene per 100 parts by weight of said modified polyphenylene ether in said mixture.

3. The resin composition according to claim 1, which further comprises 2 to 50 parts by weight of an elastomer per 100 parts by weight of said modified polyphenylene ether in said mixture.

4. The resin composition according to claim 1, wherein said polyphenylene ether is poly(2,6-dimethyl-1,4-phenylene)ether.

5. The resin composition according to claim 1, wherein said polyphenylene ether has an intrinsic viscosity of 0.1 to 0.7 dl/g at 25° C. in chloroform.

6. The resin composition according to claim 1, wherein said unsaturated carboxylic acid is maleic anhydride.

7. The resin composition according to claim 1, wherein 6,6-nylon has a relative viscosity of 2.2 to 3.2, when measured at 25° C. in 98% sulfuric acid at a concentration of 0.25 g/100 ml.

8. The resin composition according to claim 1, wherein 6-nylon has a relative viscosity of 2.2 to 3.2, when measured at 25° C. in 98% sulfuric acid at a concentration of 0.25 g/100 ml.

9. The resin composition according to claim 1, wherein said metal salt of montanic acid is sodium montanate.

10. The resin composition according to claim 2, wherein said polypropylene has a melt flow rate of 1 to 100 at 230° C. under load of 2.16 kg.

11. An automobile relay box made of a resin composition claimed in of claim 1.

12. The resin composition according to claim 5, wherein said polyphenylene ether has an intrinsic viscosity of 0.3 to 0.6 dl/g at 25° C. in chloroform.

13. The resin composition according to claim 1, wherein said polyamide comprises 100 parts by weight of 6,6-nylon and 20 to 80 parts by weight of 6-nylon.

14. The resin composition according to claim 1, wherein said mixture contains 30 to 60% by weight of said modified polyphenylene ether and 40 to 70% by weight of said polyamide.

15. The resin composition according to claim 2, wherein said mixture comprises 7 to 65 parts by weight of said polypropylene per 100 parts by weight of said modified polyphenylene ether.

* * * * *